March 16, 1948.  H. C. ANDERSEN  2,437,800
BOTTLE HOLDER
Filed Oct. 17, 1945  2 Sheets-Sheet 1

INVENTOR.
Henry C. Andersen
BY Victor J. Evans & Co.
ATTORNEYS

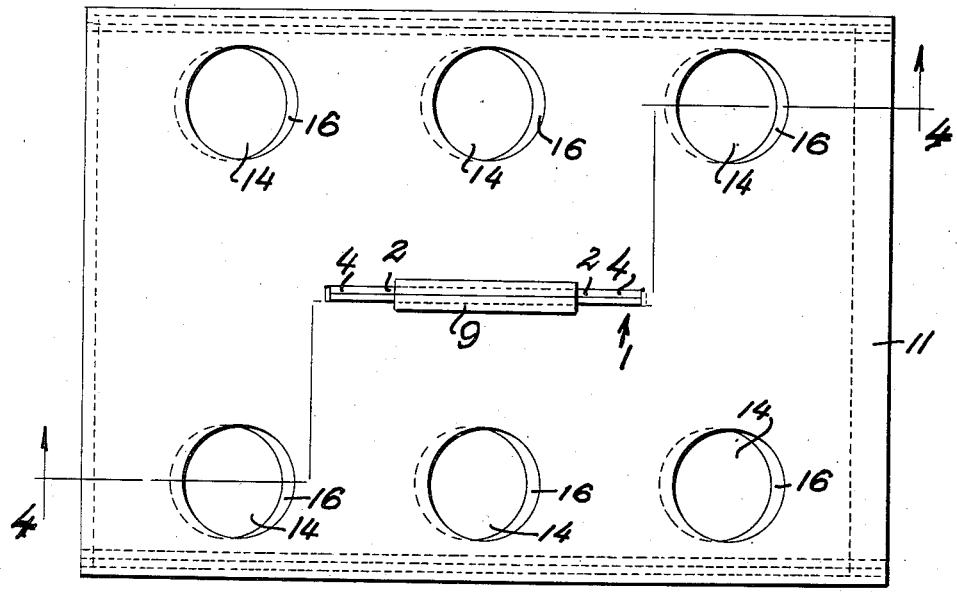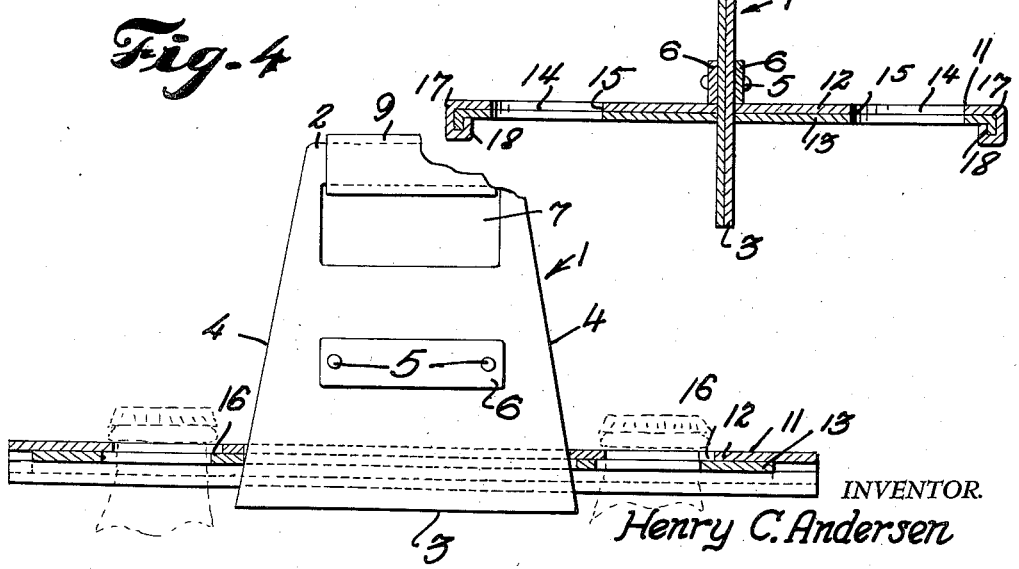

UNITED STATES PATENT OFFICE 2,437,800

BOTTLE HOLDER

Henry C. Andersen, Lancaster, Calif.

Application October 17, 1945, Serial No. 622,901

4 Claims. (Cl. 294—87)

My present invention, in its broad aspect, has to do with improvements in bottle carriers, and holders, and more especially, it is my purpose to provide a carrier which will securely clamp about the tops of any bottle of the type having a bead, or annular enlarged rim or the like, as soon as the handle is grasped and lifted, thereby providing a simple, convenient, and practical way to carry and hold bottles, and which releases the bottles as promptly and easily as it clamps about them so that the transportation of bottles takes little labor and trouble.

Other and equally important objects and advantages of my invention will be apparent from the following description and drawings, and it is pointed out that changes in form, size, shape, materials, construction and arrangement of parts are permissible and within the purview of my broad inventive concept, and the scope of the appended claims.

In the drawings, wherein I have illustrated a preferred form of my invention:

Figure 3 is a top plan view of my device with the handle lifted to slide the plates relative each other to clamp above the necks of the bottles;

Figure 4 is a section on the line 4—4 of Figure 3, and

Figure 5 is a transverse section through the handle.

In the drawings, wherein like characters of reference are used to designate like or similar parts throughout the several views:

Figure 1:
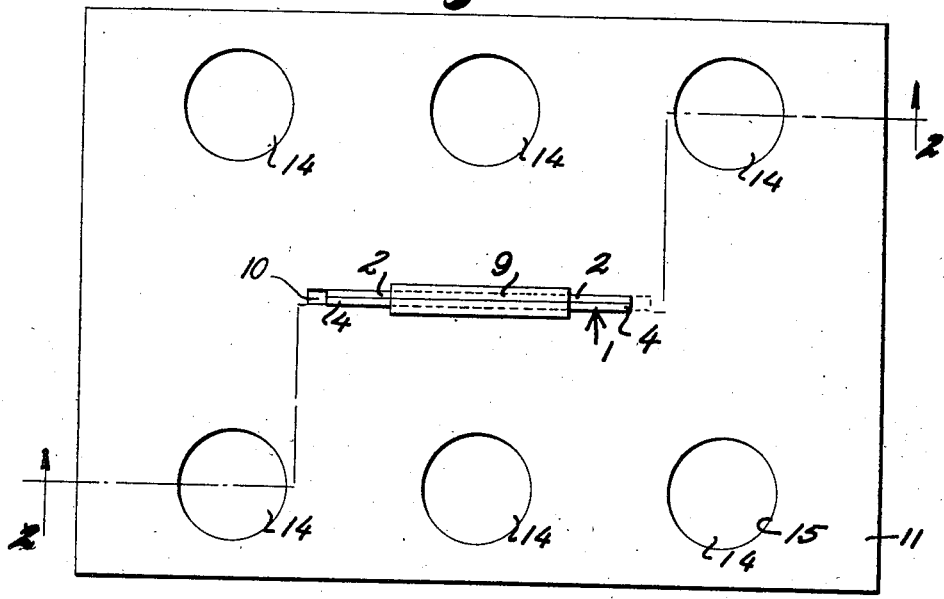
Figure 1 is a top plan view of my device, open to receive bottles.

The numeral 1 designates the handle of my device which for the sake of illustration I have shown as made of a double thickness of sheet metal. The handle has a relatively narrow top edge 2 and a wide bottom edge 3, and the side edges 4 incline outwardly and uniformly from top edge to the bottom edge. Spaced from the bottom and riveted or otherwise attached, as at 5, on each side of the handle are rectangular, elongated plates 6, forming a "stop" and the stop is closer to the bottom than the top. Parallel with the stop and above the same is a rectangular, elongated, transverse hand opening 7, the remaining part 8 of the material of the handle being covered by a piece of material 9 to provide a comfortable grip for the hand to lift the handle.

Figure 2:
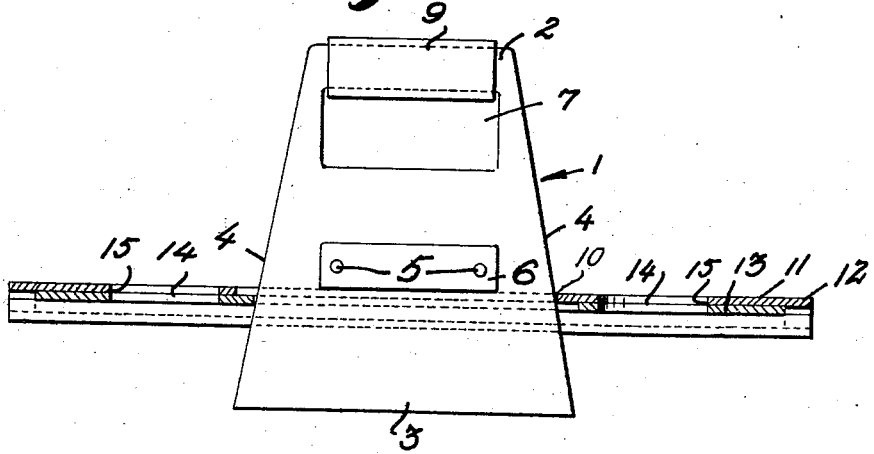
Figure 2 is a section on the line 2—2 of Figure 1, showing the wedging handle in the down position.

The handle passes through a slot 10 located centrally of the bottle carrier 11. The bottle carrier is formed with two superposed relatively sliding plates 12 and 13, provided with equally spaced bottle top receiving openings 14 registering, as at 15, in one position—see Figures 1 and 2—to receive the bottle tops, and in a slightly off-center or off-registering position 16 to clamp the tops—see Figures 3 and 4. The slots in the two plates are also off-center or off-registering to be aligned in the position of Figures 1 and 2. The handle when raised presses the ends of the slots to force them off-center or off-registering when the handle, carrier and bottles are raised. The "stop" prevents detachment of the handle. Each plate 12 and 13 is annularly and downwardly flanged, as at 17, around its edge and the flange on the top plate is bent under and about the flange of the lower plate, as at 18, to hold the plates steadily together.

In clamping the bottles it is merely necessary to place the carrier on the bottles tops—as shown in Figures 3 and 4—and lift, the handles and carrier induce clamping action, and to release the bottles it is merely necessary to release the handle.

From the foregoing it is believed that the objects and advantages of my invention will be apparent, but it is again emphasized that interpretation of its scope should only be conclusive when made in the light of the subjoined claims.

I claim:

1. A bottle carrier, comprising a pair of relatively superposed slidable plates having openings aligned in one position to receive the bottles, and relatively off-center in another position to clamp the bottles between edges thereof, the plates having slots aligned in one position and relatively off-center in another position, and a handle mounted in the slot and having downwardly and outwardly angled side parts forming a wedge to engage the ends of the slots to move said plates with the slots and openings off-center when the handle and bottles are lifted to clamp the bottles, means for slidably holding the plates together, and means for preventing detachment of the handle, said handle having a cross bar forming a stop to prevent removal of the handle from the slot although allowing limited sliding movement through the slot.

2. The invention as defined in claim 1 wherein the handle has a hand grip opening, and a piece of material turned about the handle to cushion and reinforce the material above the opening.

3. The invention as defined in claim 1 wherein the top plate has depending annular edge flanges, and the bottom plate has depending annular edge flanges slidably engaging the flanges of the top plate, and the flanges of the top plate are turned under and up about the flanges of the lower plate to form a keeper to hold the plates slidably together.

4. The invention as defined in claim 1 wherein the openings in the plates are circular and equally spaced and aligned, and the slots in the plates are centrally located between the edges of the plates and openings to receive the handle and balance the carrier when lifted by the handle.

HENRY C. ANDERSEN.

REFERENCES CITED

The following references are of record in the file of this patent:

UNITED STATES PATENTS

| Number | Name | Date |
|---|---|---|
| 2,287,731 | Franks et al. | June 23, 1942 |
| 2,386,101 | Firks et al. | Oct. 2, 1945 |